United States Patent
Matozaki et al.

(10) Patent No.: US 9,470,889 B2
(45) Date of Patent: Oct. 18, 2016

(54) LASER SCANNING DEVICE

(71) Applicant: MITSUBISHI ELECTRIC CORPORATION, Tokyo (JP)

(72) Inventors: Toshiya Matozaki, Tokyo (JP); Hironori Nakahara, Tokyo (JP); Tomo Kishigami, Tokyo (JP); Nobuo Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/917,403

(22) PCT Filed: Jun. 5, 2014

(86) PCT No.: PCT/JP2014/002989
§ 371 (c)(1),
(2) Date: Mar. 8, 2016

(87) PCT Pub. No.: WO2015/033494
PCT Pub. Date: Mar. 12, 2015

(65) Prior Publication Data
US 2016/0223810 A1 Aug. 4, 2016

(30) Foreign Application Priority Data
Sep. 9, 2013 (JP) .................................. 2013-186423

(51) Int. Cl.
G02B 26/08 (2006.01)
G02B 26/10 (2006.01)
G02B 27/14 (2006.01)
G02B 27/09 (2006.01)

(52) U.S. Cl.
CPC ......... *G02B 26/105* (2013.01); *G02B 26/0833* (2013.01); *G02B 26/101* (2013.01); *G02B 27/0927* (2013.01); *G02B 27/141* (2013.01)

(58) Field of Classification Search
CPC .............. G02B 26/105; G02B 26/101; G02B 26/0833; G02B 27/141; G02B 27/0927
USPC ......... 359/204.1–204.5, 224.1–224.2, 298.1, 359/618, 627; 347/243, 258–261
See application file for complete search history.

(56) References Cited

U.S. PATENT DOCUMENTS 6,157,478 A 12/2000 Naiki et al.
9,298,004 B2 * 3/2016 Yoshida ................. G02B 26/10
(Continued)

FOREIGN PATENT DOCUMENTS

JP 63-115125 A 5/1988
JP 64-48484 A 2/1989
(Continued)

*Primary Examiner* — James Phan
(74) *Attorney, Agent, or Firm* — Birch, Stewart, Kolasch & Birch, LLP

(57) ABSTRACT

A laser scanning device includes: a plurality of laser light sources, each of the plurality of laser light sources emitting a laser light having a light intensity distribution having an elliptical shape; an aperture through which the laser lights emitted from the plurality of laser light sources pass; and a scanning mirror for reflecting the laser lights from the aperture to a scan position. A position of the aperture is adjustable in a first adjustment direction. The plurality of laser light sources are oriented so that long axis directions of the light intensity distributions of the laser lights emitted by the plurality of laser light sources are parallel to the first adjustment direction at positions at which the laser lights emitted by the plurality of laser light sources enter the aperture.

18 Claims, 5 Drawing Sheets

(56) References Cited

U.S. PATENT DOCUMENTS

| | | |
|---|---|---|
| 2009/0021801 A1 | 1/2009 | Ishihara |
| 2011/0128602 A1 | 6/2011 | Hamano et al. |

FOREIGN PATENT DOCUMENTS

| | | |
|---|---|---|
| JP | 4-21811 A | 1/1992 |
| JP | 9-179048 A | 7/1997 |
| JP | 2001-142014 A | 5/2001 |
| JP | 2004-71591 A | 3/2004 |
| JP | 2009-25462 A | 2/2009 |
| JP | 2010-49232 A | 3/2010 |
| JP | 2010-78749 A | 4/2010 |
| JP | 2010-107615 A | 5/2010 |
| JP | 2011-102901 A | 5/2011 |

* cited by examiner

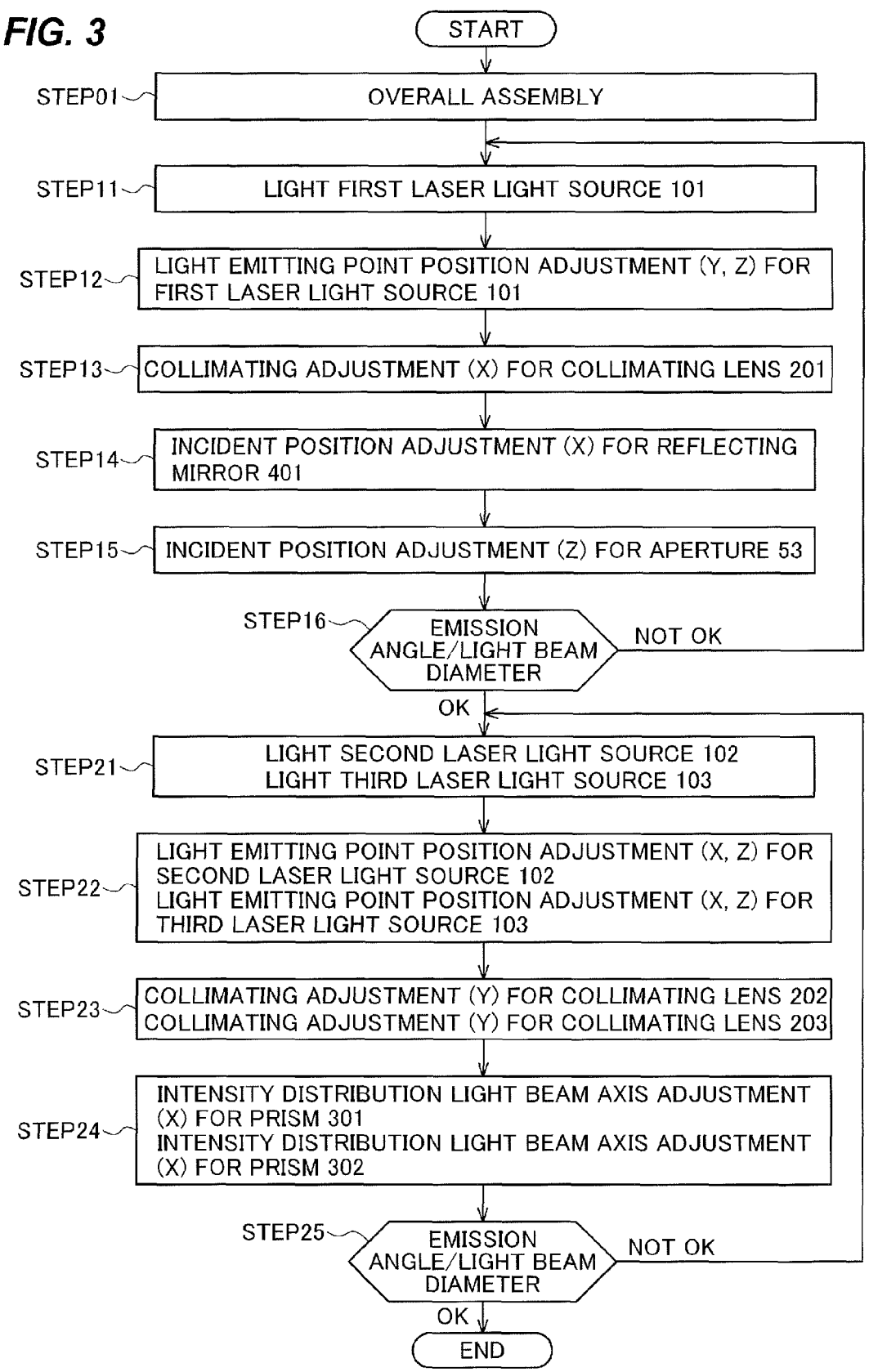

LASER SCANNING DEVICE

TECHNICAL FIELD

The present invention relates to a laser scanning device with multiple laser light sources.

BACKGROUND ART

As a conventional laser scanning device with multiple laser light sources, there is a laser scanning device that uses three types of laser light sources including a red laser, a green laser, and a blue laser, collects them in a single optical axis, and scans therewith by a MEMS (Micro Electro Mechanical Systems) mirror. This device converts a laser light emitted from each of the laser light sources into a light slightly narrowed compared to parallel light by using a condensing lens or collimating lens, converts each of the laser lights into a laser light having a predetermined shape and size by causing each of the laser lights to pass through an aperture (also referred to as an opening limitation device), directs them in a single convergence optical axis direction by using a mirror or prism, and scans therewith by using a single MEMS mirror (see, for example, Patent Reference 1).

PRIOR ART REFERENCES

Patent References

Patent Reference 1: Japanese Patent Application Publication No. 2010-107615 (pages 5-10, FIG. 1)

SUMMARY OF THE INVENTION

Problems to be Solved by the Invention

However, in the laser scanning device as in Patent Reference 1, the aperture is provided for each of the laser light sources so that when the laser lights emitted from the respective laser light sources are collected in the single convergence optical axis direction, each of the laser lights has a predetermined shape and size. Such a configuration has the following problem: in the manufacturing process of the laser scanning device, it is necessary to adjust, for each light source, the collimating lens and laser light source as a unit and then perform positional adjustment again during overall assembly, and thus there are many adjustment items in the manufacturing process of the laser scanning device.

The present invention has been made to solve the problem as described above, and is intended to provide a laser scanning device with multiple laser light sources that has a simple configuration and achieves reduction of adjustment items in the manufacturing process.

Means for Solving the Problems

An optical scanning device according to the present invention includes: a plurality of laser light sources, each of the plurality of laser light sources emitting a laser light having a light intensity distribution having an elliptical shape; a prism having a reflecting surface, the prism receiving the laser light from each of the plurality of laser light sources and directing the received laser lights in a convergence optical axis direction; an aperture having an opening through which the laser lights emitted from the prism pass, the opening being disposed so that a position of the opening is adjustable in a predetermined adjustment direction; and a scanning mirror for receiving the laser lights from the prism through the aperture and reflecting the received laser lights to a scan position, wherein the plurality of laser light sources are oriented so that long axis directions of the light intensity distributions coincide with the predetermined adjustment direction at positions at which the laser lights emitted by the plurality of laser light sources enter the aperture.

Effect of the Invention

The present invention provides an aperture on an optical path from the prism and scanning mirror so that light beams passing through the aperture of the respective laser lights emitted from the prism can be adjusted in a predetermined adjustment direction, and thus can be configured by a single aperture without providing an aperture for each laser light source. This makes it possible to provide a laser scanning device with a simple configuration and reduced adjustment items in the manufacturing process.

BRIEF DESCRIPTION OF THE DRAWINGS

FIG. 3 is a diagram illustrating a flow of assembly and adjustment of the laser scanning device according to the first embodiment of the present invention.

MODES FOR CARRYING OUT THE INVENTION

First Embodiment

Figure 1:
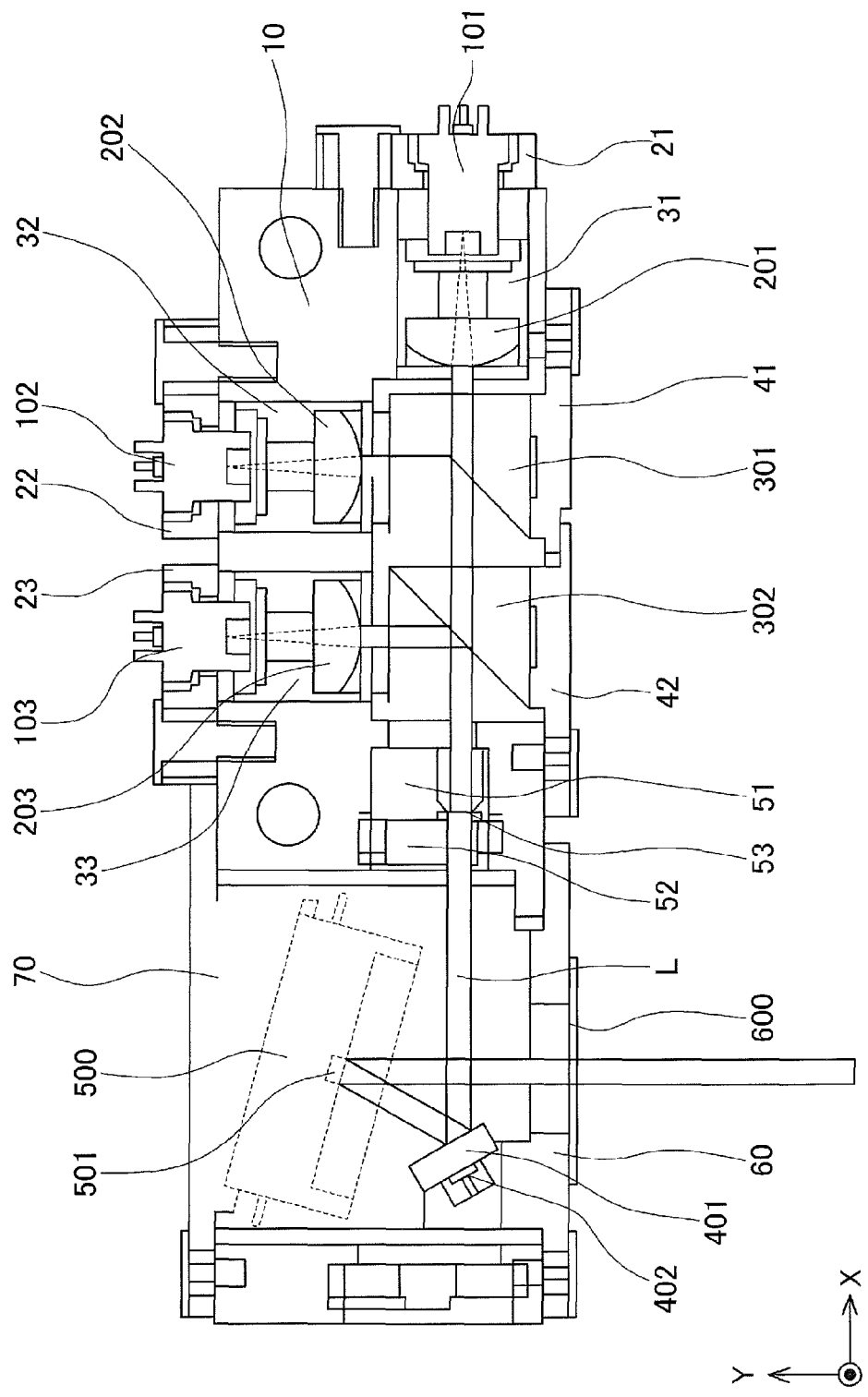
FIG. 1 is a transverse sectional view of a laser scanning device according to a first embodiment of the present invention.
Figure 2:
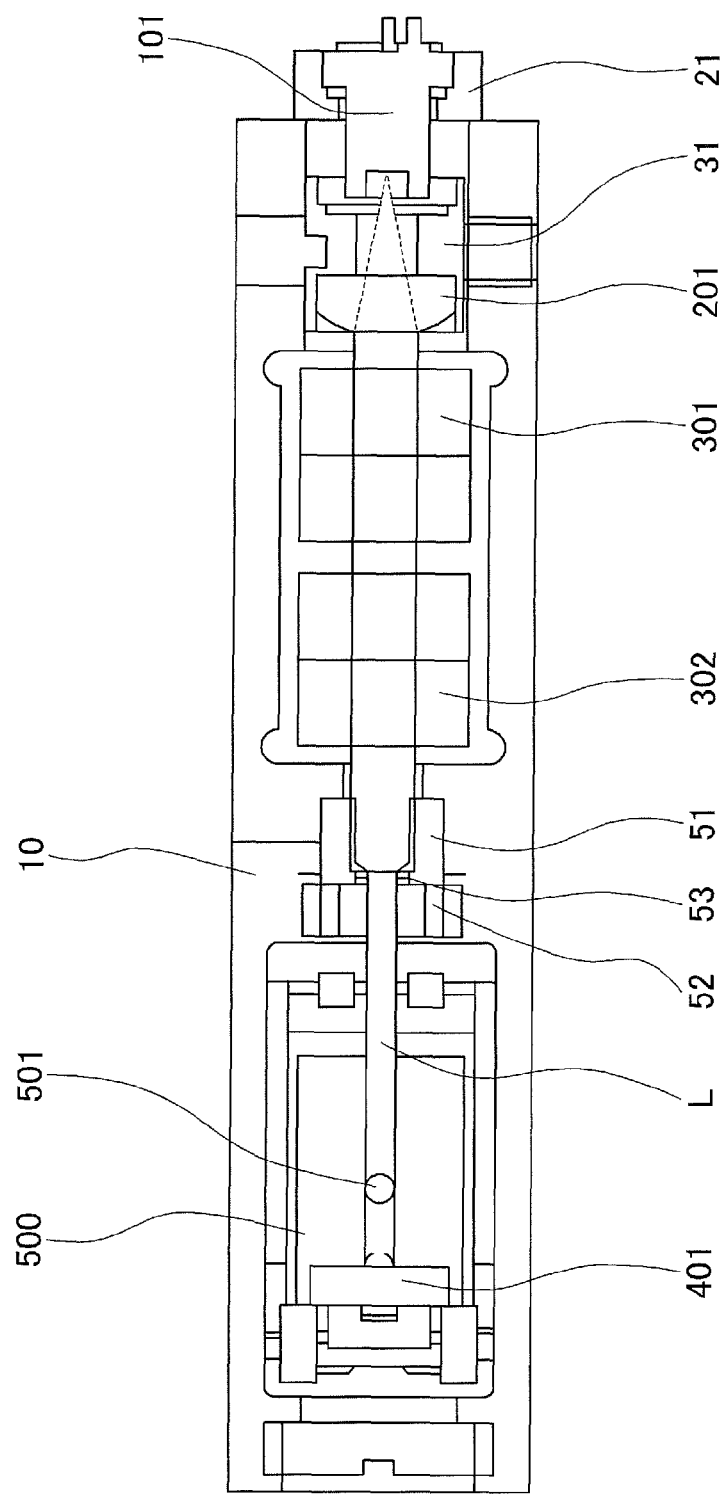
FIG. 2 is a longitudinal sectional view of the laser scanning device according to the first embodiment of the present invention.

FIG. 1 is a transverse sectional view of a laser scanning device according to this embodiment. In FIG. 1, three laser light sources 101, 102, and 103 are provided. Prisms 301 and 302 are also provided. The prism 301 directs a laser light emitted from the laser light source 102 in a convergence optical axis direction. The prism 302 directs a laser light emitted from the laser light source 103 in the convergence optical axis direction. In FIG. 1, a convergence optical axis L is shown as an axis parallel to the X axis. FIG. 2 is a longitudinal sectional view of the laser scanning device according to this embodiment taken along an X-Z plane.

In FIG. 1, the laser light source 101 is oriented to emit a laser light in the convergence optical axis direction, and thus the laser light need not be directed in the convergence optical axis direction by a reflecting surface of a prism. Further, an aperture 53 is disposed on an optical path from the prism 302 to a two-axis deflection mirror 500 in such a manner that its position can be adjusted.

Next, components will be described. A housing 10 is a housing of the laser scanning device according to this embodiment.

The first laser light source 101 emits a first laser light. For example, the first laser light source 101 is a red semiconductor laser, and the first laser light is a laser light having a red wavelength. In FIG. 1, it is disposed to emit the light in the −X direction. It is also disposed so that a direction (long axis direction) in which a radiation angle specification of a light intensity distribution characteristic is wide coincides with the Z axis direction (direction perpendicular to the drawing sheet of FIG. 1).

The first laser light source 101 is supported by a light source adjustment plate 21 so that an optical axis of the light emitted by the first laser light source 101 can be adjusted. For example, the first laser light source 101 is fixed to the light source adjustment plate 21 by press-fitting or adhesion; the light source adjustment plate 21 is brought into close contact with a side surface of the housing 10, precisely adjusted in directions in the close contact surface, and then fixed by screw-fastening or adhesion.

A collimating lens 201 is disposed in the emission direction of the first laser light source 101. The collimating lens 201 converts a light beam of the first laser light into a parallel light. The collimating lens 201 is supported by a lens adjustment holder 31. For example, the collimating lens 201 and lens adjustment holder 31 are adhesively fixed to each other, and the lens adjustment holder 31 is fitted in a cylindrical hole in the housing 10 in such a manner that its position can be precisely adjusted in the optical axis direction.

In this manner, the light source adjustment plate 21 and lens adjustment holder 31 are precisely adjusted so that the parallel light of the first laser light from the first laser light source 101 is directed in the direction of the convergence optical axis L. Here, precisely adjusted refers to precise positional adjustment.

The second laser light source 102 emits a second laser light. For example, the second laser light source 102 is a green semiconductor laser, and the second laser light is a laser light having a green wavelength. In FIG. 1, it is disposed to emit the light in the −Y direction. It is also disposed so that a direction (long axis direction) in which a radiation angle specification of a light intensity distribution characteristic is wide coincides with the Z axis direction.

The second laser light source 102 is supported by a light source adjustment plate 22 so that an optical axis of the light emitted by the second laser light source 102 can be adjusted. For example, the second laser light source 102 is fixed to the light source adjustment plate 22 by press-fitting or adhesion; the light source adjustment plate 22 is brought into close contact with a side surface of the housing 10, precisely adjusted in directions in the close contact surface, and then fixed by screw-fastening or adhesion.

A collimating lens 202 is disposed in the emission direction of the second laser light source 102. The collimating lens 202 converts a light beam of the second laser light into a parallel light. The collimating lens 202 is supported by a lens adjustment holder 32. For example, the collimating lens 202 and lens adjustment holder 32 are adhesively fixed to each other, and the lens adjustment holder 32 is fitted in a cylindrical hole in the housing 10 in such a manner that its position can be precisely adjusted in the optical axis direction.

The parallel light of the second laser light emitted from the collimating lens 202 is directed in the convergence optical axis direction by the prism beam splitter (also referred to as a prism) 301. The prism beam splitter 301 has a reflecting surface inclined at 45 degrees in the prism, and reflects, in the −X direction, a light beam incident from the −Y direction.

The prism beam splitter 301 is supported by a prism adjustment holder 41. For example, the prism beam splitter 301 and prism adjustment holder 41 are adhesively fixed to each other, and the prism adjustment holder 41 is precisely moved in the X axis direction against a side surface of the housing 10, so that the reflecting surface in the prism is precisely moved in the X axis direction in FIG. 1. By moving the reflecting surface in the prism in the X axis direction, the light beam resulting from reflection of the parallel light of the second laser light incident on the reflecting surface can be adjusted in the Y axis direction.

In this manner, the light source adjustment plate 22, lens adjustment holder 32, and prism adjustment holder 41 are precisely adjusted so that the parallel light of the second laser light from the second laser light source 102 is directed along the convergence optical axis.

The third laser light source 103 emits a third laser light. For example, the third laser light source 103 is a blue semiconductor laser, and the third laser light is a laser light having a blue wavelength. In FIG. 1, it is disposed to emit the light in the −Y direction. It is also disposed so that a direction (long axis direction) in which a radiation angle specification of a light intensity distribution characteristic is wide coincides with the Z axis direction.

The third laser light source 103 is supported by a light source adjustment plate 23 so that an optical axis of the light emitted by the third laser light source 103 can be adjusted. For example, the third laser light source 103 is fixed to the light source adjustment plate 23 by press-fitting or adhesion; the light source adjustment plate 23 is brought into close contact with a side surface of the housing 10, precisely adjusted in directions in the close contact surface, and then fixed by screw-fastening or adhesion.

A collimating lens 203 is disposed in the emission direction of the third laser light source 103. The collimating lens 203 converts a light beam of the third laser light into a parallel light. The collimating lens 203 is supported by a lens adjustment holder 33. For example, the collimating lens 203 and lens adjustment holder 33 are adhesively fixed to each other, and the lens adjustment holder 33 is fitted in a cylindrical hole in the housing 10 in such a manner that its position can be precisely adjusted in the optical axis direction.

The parallel light of the third laser light emitted from the collimating lens 203 is directed in the convergence optical axis direction by the prism beam splitter 302. The prism beam splitter 302 has a reflecting surface inclined at 45 degrees in the prism, and reflects, in the −X direction, a light beam incident from the −Y direction.

The prism beam splitter 302 is supported by a prism adjustment holder 42. For example, the prism beam splitter 302 and prism adjustment holder 42 are adhesively fixed to each other, and the prism adjustment holder 42 is precisely moved in the X axis direction against a side surface of the housing 10, so that the reflecting surface in the prism is precisely moved in the X axis direction in FIG. 1. By moving the reflecting surface in the prism in the X axis direction, the light beam resulting from reflection of the parallel light of the third laser light incident on the reflecting surface can be adjusted in the Y axis direction.

In this manner, the light source adjustment plate 23, lens adjustment holder 33, and prism adjustment holder 42 are precisely adjusted so that the parallel light of the third laser light from the third laser light source 103 is directed along the convergence optical axis.

A part where the prism adjustment holders 41 and 42 abut each other is provided with a stepped structure, and is configured so that when each of them is adjusted, no gap through which the inside of the housing 10 can be viewed occurs.

The light beams directed along the convergence optical axis L are incident on the two-axis deflection mirror (also referred to as a scanning mirror) 500 through the aperture 53 described later. In FIG. 1, the light beams directed along the convergence optical axis L are reflected by a mirror 401 and incident on the two-axis deflection mirror 500.

The mirror 401 is supported by a mirror adjustment plate 60. For example, the mirror 401 and mirror adjustment plate 60 are fixed to each other, and the mirror adjustment plate 60 is fixed to the housing 10 in such a manner that its position can be precisely adjusted in the X axis direction.

The two-axis deflection mirror 500 includes a MEMS mirror 501. The two-axis deflection mirror 500 receives an electrical signal for two-dimensional scanning and changes an angle of a reflecting surface of the MEMS mirror 501 by an actuator. In this manner, the two-axis deflection mirror 500 changes the angle of the reflecting surface of the MEMS mirror 501, thereby changing a reflection angle of a light beam incident on the MEMS mirror 501. This enables emission to a display area in an X-Z plane. Although this embodiment describes a two-dimensional laser scanning device, when a one dimensional laser scanning device is configured, the scanning mirror 500 receives an electrical signal for one-dimensional scanning and changes an angle of a reflecting surface of the MEMS mirror 501 by an actuator.

The two-axis deflection mirror 500 is supported by a MEMS mirror plate 70. For example, the two-axis deflection mirror 500 and MEMS mirror plate 70 are fixed to each other, and the MEMS mirror plate 70 is fixed to the housing 10.

The aperture 53 is an opening configured to block undesired light generated by the prisms, housing, or other parts on the way and transmit only necessary light. The light beams from the respective laser light sources directed along the convergence optical axis L pass through the aperture 53 to form a predetermined light beam.

The aperture 53 is disposed eccentrically with respect to a center axis of a cylindrical aperture adjustment holder 51.

The aperture adjustment holder 51 provided with the aperture 53 is accurately inserted in a cylindrical hole in the housing 10.

The cylindrical hole in the housing 10 has an opening in which the aperture adjustment holder 51 is precisely fitted, and accurately positions the aperture adjustment holder 51 in the direction of the center axis.

Further, an internal thread portion is provided at the inlet portion of the cylindrical hole in the housing 10, and a ring-shaped screw ring 52 with an external thread portion on its outer side is rotationally inserted in the inlet portion, so that the aperture adjustment holder 51 is accurately fixed to the housing 10 in a state in which it is properly pressurized.

The external thread portion of the screw ring 52 and the internal thread portion of the cylindrical hole in the housing 10 are fine threads having a narrow screw pitch, but may be coarse threads.

A slot is provided in a part of a cylindrical outer periphery of the aperture adjustment holder 51 in parallel with the center axis, and an opening is provided in a top surface of the housing 10 so that the slot can be viewed through the opening.

The aperture adjustment holder 51 can be rotationally adjusted precisely by using an eccentric pin through the opening.

Thus, as the aperture adjustment holder 51 is rotationally adjusted with the eccentric pin, the aperture 53 slightly moves in the Z axis direction (a predetermined adjustment direction).

This makes it possible to adjust a center axis of the aperture 53 so that the center axis of the aperture 53 coincides with an optical axis center of a light beam directed along the convergence optical axis L.

The aperture 53 is formed integrally with the aperture adjustment holder 51. However, a separate part may be formed, as a portion having the aperture 53, by providing an opening in a metal thin plate or metal foil having a thin thickness, and then fixed to the aperture adjustment holder 51 by press-fitting, adhesion, or other ways.

As above, it is configured so that for each of the laser lights from the laser light sources, in the light beam that is directed along the convergence optical axis L and enters the aperture 53, the direction (long axis direction) in which the radiation angle specification of the light intensity distribution characteristic is wide coincides with the Z axis direction. With this configuration, by the adjustment in the Z axis direction by the aperture adjustment holder 51, it is possible to allow passage of a predetermined light beam of the laser lights from the respective laser light sources. Thus, it can be configured without providing an aperture for each laser light source. This makes it possible to provide a laser scanning device with a simple configuration.

Next, a method of assembling and adjusting the laser scanning device according to the present invention will be described. FIG. 3 is a flowchart illustrating the method of assembling and adjusting the laser scanning device according to the present invention. FIGS. 4(A) to 4(D) are diagrams illustrating an adjustment target in a step of an adjustment procedure of the present invention, and positional relationships between intensity distributions (elliptical shapes) of light from the laser light sources and a light beam (circular region) after passing through the aperture. Here, light sources, such as semiconductor lasers, having elliptical light intensity distributions are used as the laser light sources.

It will be assumed that a laser beam profiler is used in measurement for positional adjustment, for example.

First, overall assembly of the components of the laser scanning device according to the present invention is performed (step 01).

Next, the first laser light source 101 is lit (step 11).

Next, the position of a light emitting point of the first laser light source 101 is adjusted (step 12). Here, the light source adjustment plate 21 and the lens adjustment holder 31 supporting the collimating lens 201 are adjusted so that the collimated light is directed in the direction of the convergence optical axis L.

Next, adjustment for matching the light emitting point of the first laser light source 101 with a focal length of the collimating lens 201 is performed (step 13). By matching the light emitting point of the semiconductor laser 101 with the focal length of the collimating lens 201, the light passing through the collimating lens becomes collimated light. However, since actual components have an optical axis tolerance of the collimating lens and a light emitting point tolerance of the semiconductor laser, the first semiconductor laser 101 is adjusted in a plane so that a predetermined emission angle is obtained.

Next, the incident position on the reflecting mirror 401 is adjusted by using the mirror adjustment plate 60 (step 14). By moving the mirror adjustment plate 60 in the X direction with an eccentric pin to adjust the incident position on the reflecting mirror 401, the incident position in the X direction at which the light reflected from the reflecting mirror 401 is incident on the MEMS mirror 501 is adjusted.

Next, the incident position on the MEMS mirror 501 in the Z direction is adjusted by using the aperture adjustment holder 51 (step 15). By rotationally moving the aperture adjustment holder 51 with an eccentric pin, the incident position on the MEMS mirror 501 in the Z direction can be adjusted.

Figure 4B:
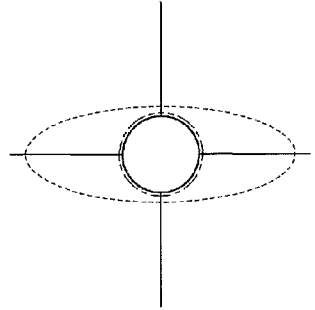
FIGS. 4(A) to 4(D) are diagrams illustrating an adjustment target in a step of adjustment of the laser scanning device according to the first embodiment of the present invention, and positional relationships between intensity distributions of light from laser light sources and a light beam after passing through an aperture.
Figure 4D:
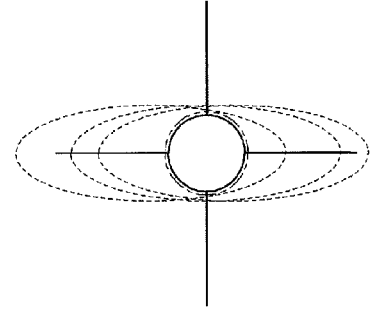
Figure 4A:
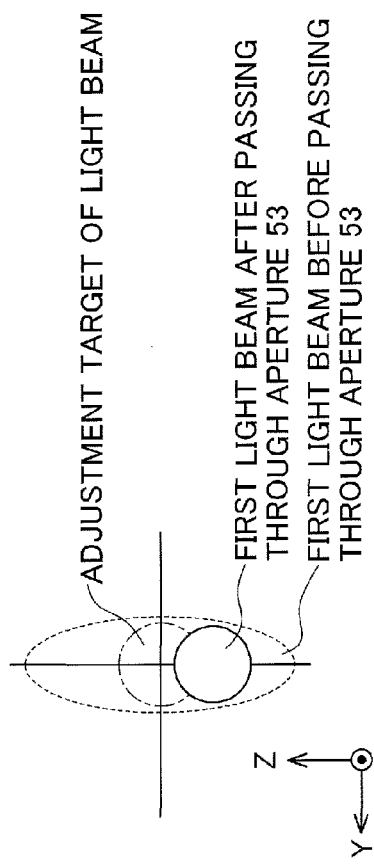

FIG. 4(A) illustrates a positional relationship before the adjustment in step 15 between the adjustment target and the intensity distribution of the light from the first laser light source 101 and the light beam (circular region) after passing through the aperture 53. By performing the adjustment in step 15, the position of the circular first light beam after passing through the aperture 53 from the first laser light source 101 is adjusted to the position of the adjustment target, as illustrated in FIG. 4(B).

Next, by using the laser beam profiler, it is determined whether the circular first light beam after passing through the aperture 53 has a desired emission angle and light beam diameter (step 16); if there is no problem (if it is OK), the procedure proceeds to next step 21; if there is any problem (if it is not OK), the procedure returns to step 11 and the adjustment is performed again.

Next, the second laser light source 102 and third laser light source 103 are lit (step 21).

Next, the positions of light emitting points of the second laser light source 102 and third laser light source 103 are adjusted (step 22).

Next, adjustment for matching the light emitting point of the second laser light source 102 with a focal length of the collimating lens 202 and matching the light emitting point of the third laser light source 103 with a focal length of the collimating lens 203 is performed (step 23).

The adjustment method in step 22 is similar to that in step 12; the adjustment method in step 23 is similar to that in step 13; the adjustments are performed so that each of the collimated lights is directed in the direction of the convergence optical axis L. However, since the second laser light source 102 and third laser light source 103 are different in orientation from the first laser light source 101, the respective adjustment directions are different accordingly.

Next, by using the prism adjustment plates 41 and 42, intensity distribution light beams of the respective collimated lights are adjusted (step 24). The light intensity distribution of the light beam (second light beam) from the second semiconductor laser 102 and the light intensity distribution of the light beam (third light beam) from the third semiconductor laser 103 are elliptical distributions. The prism adjustment plates 41 and 42 provided with the prisms 301 and 302 are moved and adjusted in the X axis direction with an eccentric pin so that center axes of these elliptical distributions in an ellipse short axis direction in which the elliptical distributions are narrow coincide with a center axis of the first light beam in the ellipse short axis direction.

The light intensity distributions of the first, second, and third light beams coincide with each other in the ellipse short axis direction, and are slightly displaced from each other in an ellipse long axis direction. However, regarding the ellipse long axis direction, regions of the light intensity distributions passing through the aperture 53 sufficiently overlap with each other, and thus no adjustment is performed.

Figure 4C:
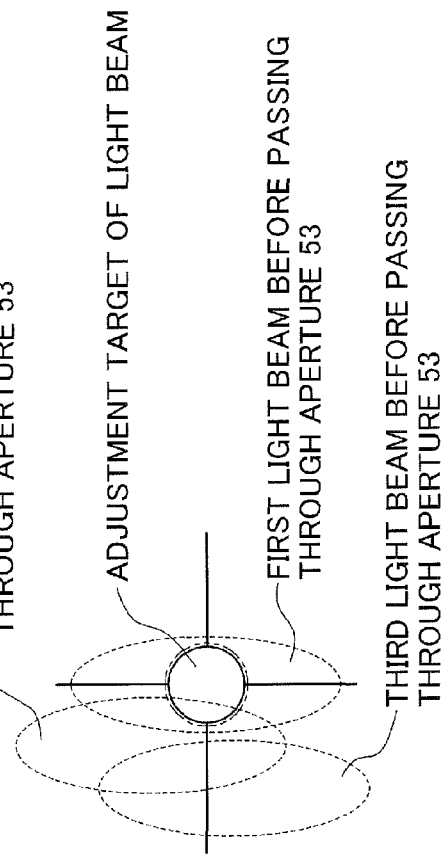

FIG. 4(C) illustrates a positional relationship before the adjustment in step 24 between the adjustment target, the light intensity distribution of the first light beam adjusted in step 15, and the light intensity distributions of the second and third light beams. By performing the adjustment in step 24, the center axes of the light intensity distributions of the second and third light beams in the ellipse short direction are adjusted so that they coincide with the center axis of the light intensity distribution of the first light beam in the ellipse short axis direction, as illustrated in FIG. 4(D).

Next, by using the laser beam profiler, it is determined whether the second and third light beams after passing through the aperture 53 have desired emission angles and light beam diameters (step 25); if there is no problem (if it is OK), the adjustment is completed; if there is any problem (if it is not OK), the procedure returns to step 21 and the adjustment is performed again.

Figure 5:
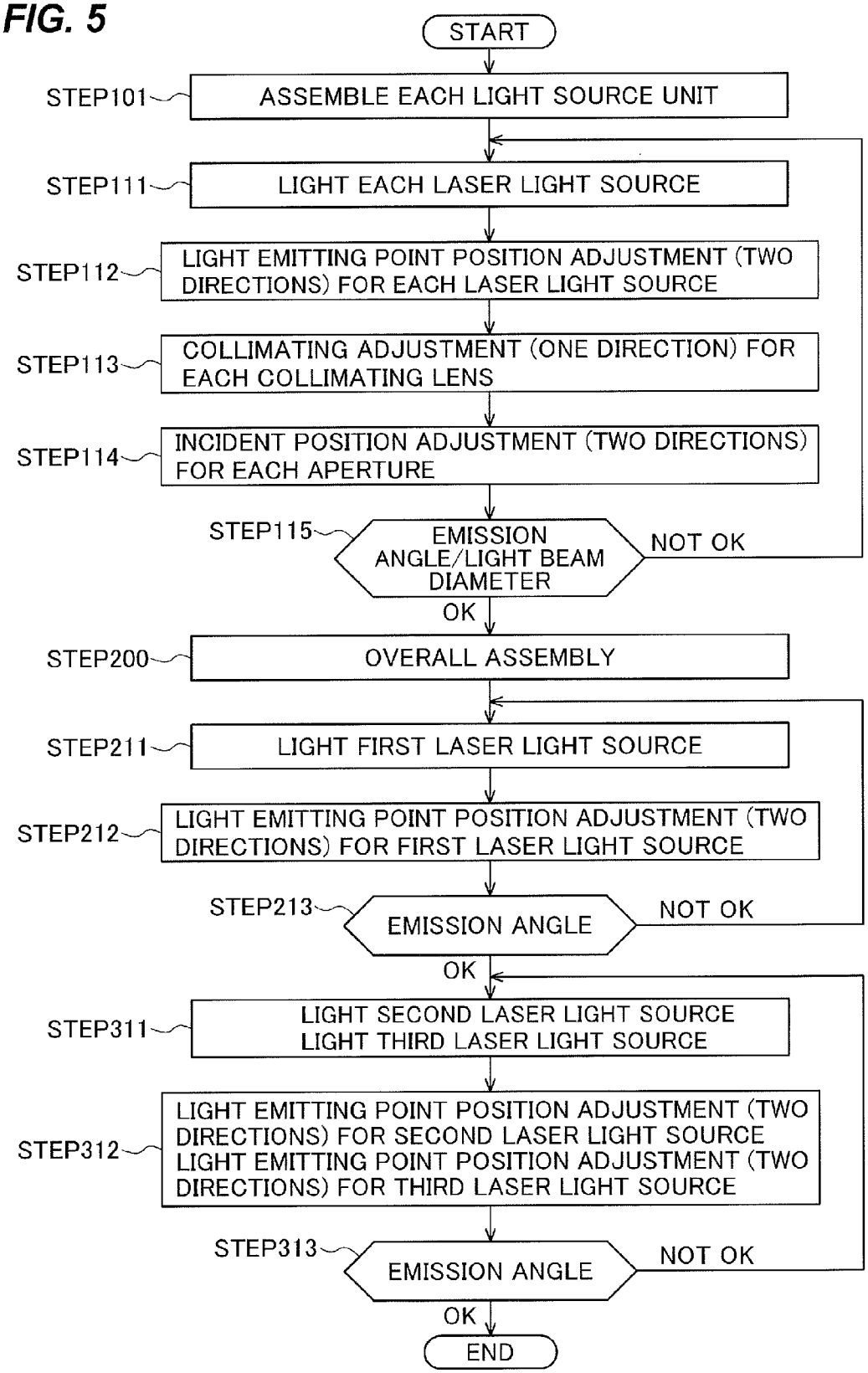
FIG. 5 is a diagram illustrating a flow of assembly and adjustment of a conventional laser scanning device.

FIG. 5 is a diagram illustrating a flow of an adjustment method in assembly of a conventional laser scanning device with three laser light sources. As illustrated in FIG. 5, in the assembly of the conventional laser scanning device, adjustment is made for 2 directions (2 points) in step 112, 1 direction (1 point) in step 113, and 2 directions (2 points) in step 114, for each laser light source, i.e., a total of 15 points. In addition, adjustment is made for 2 directions (2 points) in step 212 and for 2 directions (2 points) for each of the two laser light sources in step 312, i.e., a total of 6 points. Thus, adjustment is made for a grand total of 21 points.

On the other hand, in the adjustment method illustrated in FIG. 3 in assembly of the laser scanning device according to the present invention, adjustment is made for the Y and Z directions (2 points) in step 12, the X direction (1 point) in step 13, the X direction (1 point) in step 14, and the Z direction (1 point) in step 15, for the first laser light source, i.e., a total of 5 points. In addition, adjustment is made for the X and Z directions (2 points) in step 22, the Y direction (1 point) in step 23, and the X direction (1 point) in step 24, for each of the two laser light sources, i.e., a total of 8 points. Thus, adjustment is made for a grand total of 13 points.

As such, according to the adjustment method in assembly of the laser scanning device of the present invention, the number of adjustment points can be reduced from 21 to 13, in comparison with the adjustment method in assembly of the conventional laser scanning device with the three laser light sources.

Further, in the conventional procedure, when the three light source units are assembled, each of the aperture, collimating lens, and laser light source of each of the three light source units needs to be adjusted and fixed, and thus a total of 9 points need to be fixed. Further, during overall assembly, each of the light source units needs to be adjusted and fixed, and thus a total of 3 points need to be fixed. Therefore, during assembly of the entire laser scanning device, a total of 12 points need to be fixed.

For the laser scanning device according to the present invention, the assembly is completed by adjusting and fixing the collimating lenses (201, 202, and 203), semiconductor lasers (101, 102, and 103), prisms (301 and 302), reflecting mirror 401, and aperture 53, i.e., by fixing a total of 10 points. Thus, while the total number of fixed points after adjustment is 12 in the conventional procedure, it can be reduced to 10 according to the present invention.

As described above, in the conventional laser scanning device with the three laser light sources, a light source unit needs to be configured for each laser light source, resulting in limitations in the number of parts and downsizing. Further, while the conventional laser scanning device has a problem that many devices and processes for adjusting the light source units are required for the assembly, the laser scanning device according to the present invention can be configured without providing an aperture for each laser light source. This provides an advantage that it becomes possible to achieve a laser scanning device with a simple configuration.

Further, the conventional laser scanning device has a problem that the effect of undesired reflection light from a prism or housing between the apertures of the light source units and the MEMS mirror cannot be eliminated. In contrast, in the laser scanning device according to the present invention, there is no need to provide a prism or housing, which may generate undesired reflection light, in the optical path between the aperture and the MEMS mirror, and thus it is possible to provide a laser scanning device free from effects of undesired reflection light related to the optical path between the aperture and the MEMS mirror.

In this embodiment and the drawings, the prisms are shown to have a cube shape. However, the prisms are not limited to this shape, and may have a plate-like shape, for example. Even in this case, the prism 301 or 302 has a reflecting surface inclined at 45 degrees, and a function of reflecting a light beam incident from a first direction (the −Y direction) in a second direction (the −X direction) perpendicular to the first direction and transmitting, in the second direction (the −X direction), a light beam incident from a third direction (the X direction) opposite to the second direction.

DESCRIPTION OF REFERENCE CHARACTERS

101, 102, 103 laser light source, 301, 302 prism, 51 aperture adjustment holder, 53 aperture, 500 scanning mirror.

What is claimed is:

1. A laser scanning device comprising:
   a plurality of laser light sources, each of the plurality of laser light sources emitting a laser light having a light intensity distribution having an elliptical shape;
   an aperture through which the laser lights emitted from the plurality of laser light sources pass; and
   a scanning mirror for reflecting the laser lights from the aperture to a scan position,
   wherein a position of the aperture is adjustable in a first adjustment direction, and
   wherein the plurality of laser light sources are oriented so that long axis directions of the light intensity distributions of the laser lights emitted by the plurality of laser light sources are parallel to the first adjustment direction at positions at which the laser lights emitted by the plurality of laser light sources enter the aperture.

2. The laser scanning device of claim 1, further comprising a reflecting mirror for reflecting the laser lights from the aperture to the scanning mirror, wherein:
   a position of the reflecting mirror is adjustable in a second adjustment direction;
   the second adjustment direction is parallel to a convergence optical axis direction in which the laser lights are incident on the reflecting mirror; and
   the first adjustment direction is perpendicular to the second adjustment direction.

3. The laser scanning device of claim 2, further comprising a beam splitter having a reflecting surface, the beam splitter receiving the laser lights from the plurality of laser light sources and directing the received laser lights in the convergence optical axis direction, wherein:
   the plurality of laser light sources are adjusted and positioned so that the laser lights emitted from the plurality of laser light sources are directed in the convergence optical axis direction through the beam splitter; and
   the beam splitter is adjusted and positioned so that each of the laser lights directed in the convergence optical axis direction enters the aperture through the beam splitter, and the aperture blocks undesired light of the entering laser lights and transmits necessary light of the entering laser lights.

4. The laser scanning device of claim 3, further comprising an aperture adjustment holder for holding the aperture at a position eccentric to a rotational axis parallel to the convergence optical axis direction, and rotating about the rotational axis to adjust the position of the aperture.

5. The laser scanning device of claim 2, further comprising an aperture adjustment holder for holding the aperture at a position eccentric to a rotational axis parallel to the convergence optical axis direction, and rotating about the rotational axis to adjust the position of the aperture.

6. The laser scanning device of claim 2, wherein the aperture is movable only in one direction that is the first adjustment direction.

7. The laser scanning device of claim 6, further comprising a beam splitter having a reflecting surface, the beam splitter receiving the laser lights from the plurality of laser light sources and directing the received laser lights in the convergence optical axis direction, wherein:
   the plurality of laser light sources are adjusted and positioned so that the laser lights emitted from the plurality of laser light sources are directed in the convergence optical axis direction through the beam splitter; and
   the beam splitter is adjusted and positioned so that each of the laser lights directed in the convergence optical axis direction enters the aperture through the beam splitter, and the aperture blocks undesired light of the entering laser lights and transmits necessary light of the entering laser lights.

8. The laser scanning device of claim 7, further comprising an aperture adjustment holder for holding the aperture at a position eccentric to a rotational axis parallel to the convergence optical axis direction, and rotating about the rotational axis to adjust the position of the aperture.

9. The laser scanning device of claim 6, further comprising an aperture adjustment holder for holding the aperture at a position eccentric to a rotational axis parallel to the convergence optical axis direction, and rotating about the rotational axis to adjust the position of the aperture.

10. The laser scanning device of claim 1, wherein the reflecting mirror is movable only in one direction that is the second adjustment direction.

11. The laser scanning device of claim 10, further comprising a beam splitter having a reflecting surface, the beam splitter receiving the laser lights from the plurality of laser light sources and directing the received laser lights in the convergence optical axis direction, wherein:
   the plurality of laser light sources are adjusted and positioned so that the laser lights emitted from the plurality of laser light sources are directed in the convergence optical axis direction through the beam splitter; and
   the beam splitter is adjusted and positioned so that each of the laser lights directed in the convergence optical axis direction enters the aperture through the beam splitter, and the aperture blocks undesired light of the entering laser lights and transmits necessary light of the entering laser lights.

12. The laser scanning device of claim 11, further comprising an aperture adjustment holder for holding the aperture at a position eccentric to a rotational axis parallel to the convergence optical axis direction, and rotating about the rotational axis to adjust the position of the aperture.

13. The laser scanning device of claim 10, further comprising an aperture adjustment holder for holding the aperture at a position eccentric to a rotational axis parallel to the convergence optical axis direction, and rotating about the rotational axis to adjust the position of the aperture.

14. The laser scanning device of claim 10, wherein the aperture is movable only in one direction that is the first adjustment direction.

15. The laser scanning device of claim 14, further comprising a beam splitter having a reflecting surface, the beam splitter receiving the laser lights from the plurality of laser light sources and directing the received laser lights in the convergence optical axis direction, wherein:
   the plurality of laser light sources are adjusted and positioned so that the laser lights emitted from the plurality of laser light sources are directed in the convergence optical axis direction through the beam splitter; and
   the beam splitter is adjusted and positioned so that each of the laser lights directed in the convergence optical axis direction enters the aperture through the beam splitter, and the aperture blocks undesired light of the entering laser lights and transmits necessary light of the entering laser lights.

16. The laser scanning device of claim 15, further comprising an aperture adjustment holder for holding the aperture at a position eccentric to a rotational axis parallel to the convergence optical axis direction, and rotating about the rotational axis to adjust the position of the aperture.

17. The laser scanning device of claim 14, further comprising an aperture adjustment holder for holding the aperture at a position eccentric to a rotational axis parallel to the convergence optical axis direction, and rotating about the rotational axis to adjust the position of the aperture.

18. The laser scanning device of claim 1, wherein the aperture is movable only in one direction that is the first adjustment direction.

* * * * *